United States Patent Office 2,948,856
Patented Aug. 9, 1960

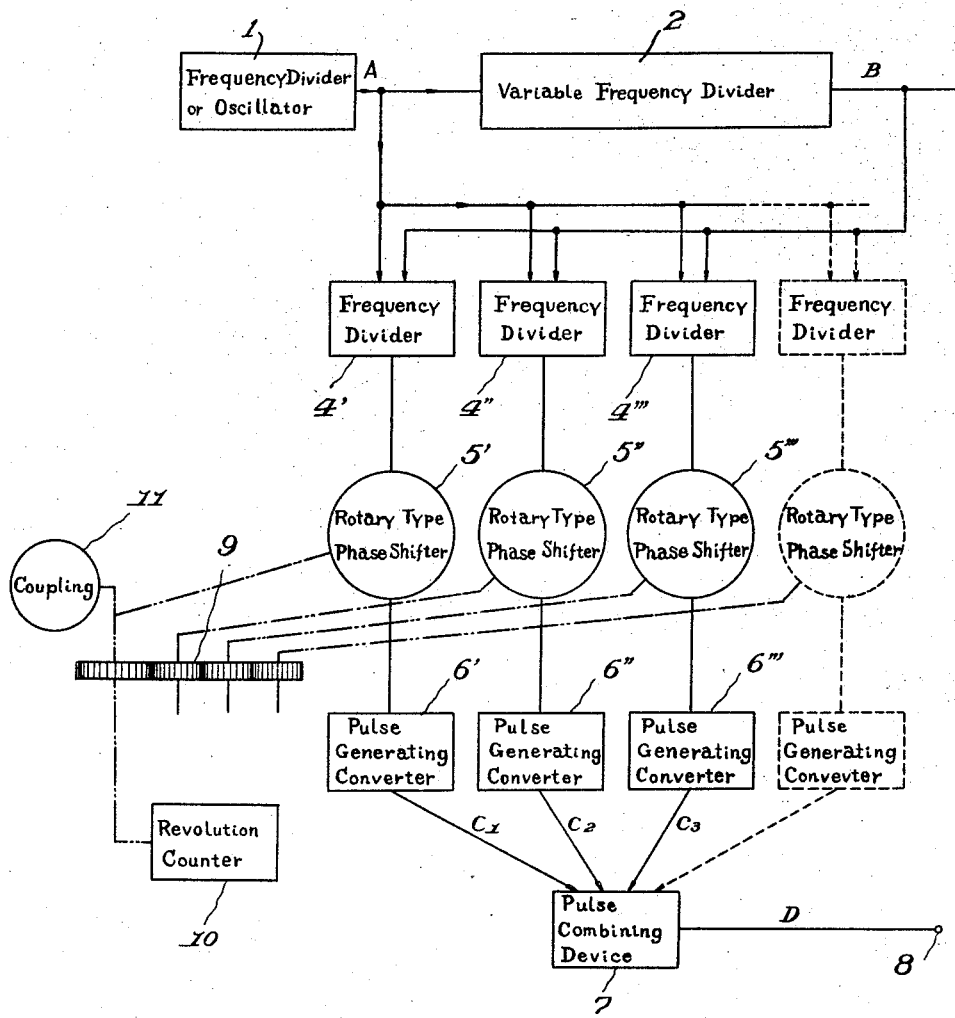

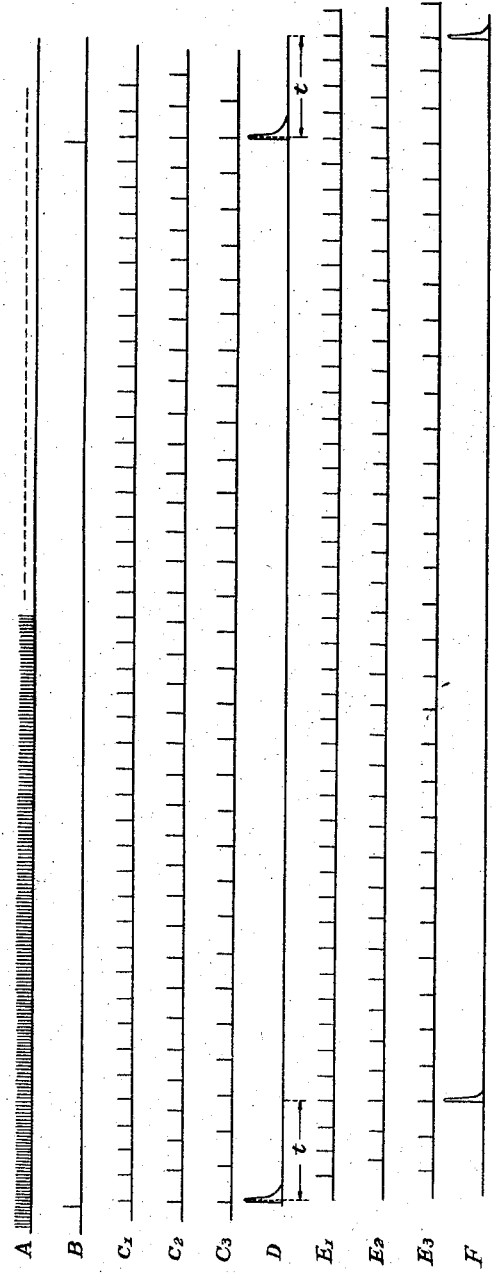

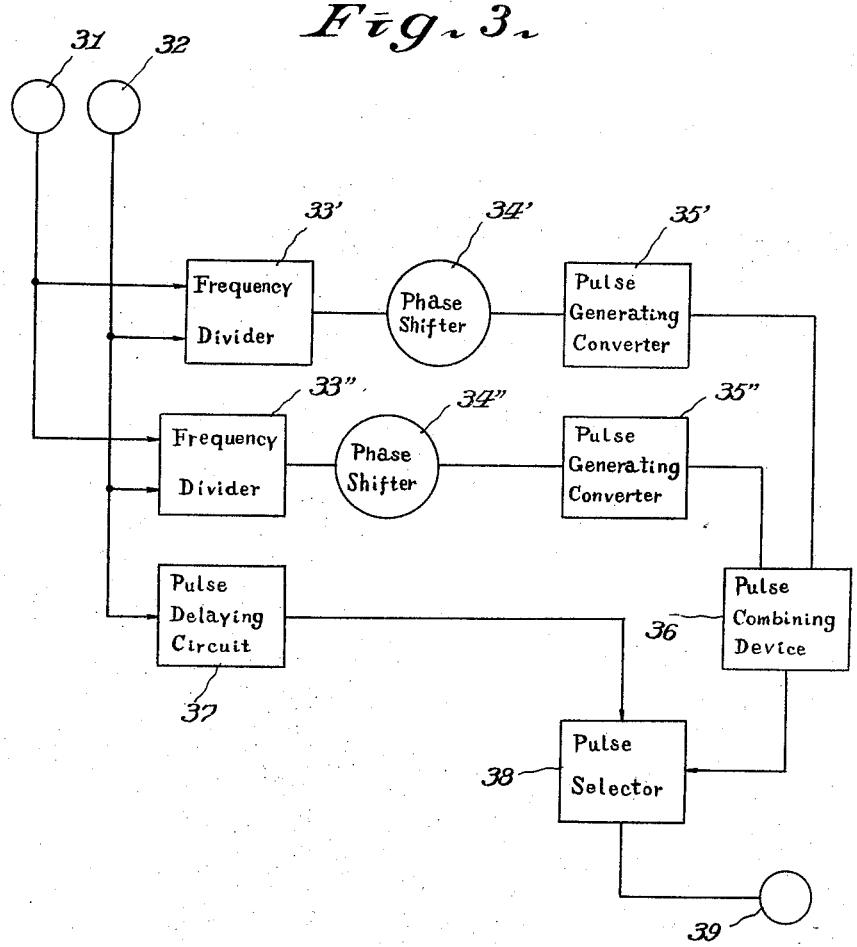

2,948,856

DIRECT READING TYPE MEASURING SYSTEM FOR TIME DIFFERENCE OR PHASE DIFFERENCE BETWEEN TWO RECEIVED SIGNAL WAVES

Isokazu Tanaka, Suginami-ku, Tokyo-to, and Shizuo Kurimura, Ota-ku, Tokyo-to, Japan, assignors to Kabushiki-Kaisha Koden Seisakusho, Shinagaiwa-ku, Tokyo-to, Japan Filed Dec. 5, 1957, Ser. No. 700,858

Claims priority, application Japan Dec. 12, 1956

6 Claims. (Cl. 328—110)

This invention relates to a system capable of measuring the time difference or phase difference between two received signal waves, each having a certain predetermined periodicity, by means of a fixed pulse and a movable pulse, and more particularly relates to a method for generating said movable pulse suitable for the system as described above.

For the measuring of time difference or phase difference between two received signal waves, it has been conventionally adopted to synchronize the sweeping of a cathode ray tube with the repeating period of said received signal waves to stop said signal waves on the fluorescent screen of said tube and to determine the time difference or phase difference from the interval of said stopped signal waves on said screen. However, for the precise measurement of said interval, it is usual to adopt the system, in which a fixed pulse having a certain interval from the sweeping, synchronizing pulse and a movable pulse capable of separating from said synchronizing pulse by an interval in accordance with the rotating angle of a rotary type phase shifter generating said fixed pulse which is superposed on one received signal wave and said movable pulse which is superposed on the other received signal wave by rotation of a phase shifter on the fluorescent screen of a cathode ray tube. Direct reading of the time difference or phase difference between the two received signal waves is attained from the interval between said two superposed pulses by means of a revolution counter connected to the above-mentioned rotary type phase shifter. In this case, for obtaining a highly precise movable pulse, it is conventional to adopt the system which comprises taking several waves of desirable frequencies out of the frequency divider or oscillator which is required for obtaining the synchronous signal necessary for synchronizing the sweeping of a cathode ray tube with two received signal waves, shifting said taken waves of desirable frequencies by respective phase shifters, and selecting a shifted signal wave of a higher frequency by the shifted signal wave of the lowermost frequency and selecting other shifted signal wave of a frequency higher than that of said selected signal wave by this signal wave and so on, whereby a precise phase shifted output pulse is produced at the desirable periodicity to measure the interval of the signal wave to be measured by comparison. According to this system, however, it is necessary to take out several kinds of output pulses having different frequencies from the synchronously sweeping frequency divider, so that said system has the following disadvantages.

(a) Referring to divided frequency distribution, the construction of the frequency divider is subjected to restraint by various conditions.

(b) Particularly, when the dividing ratio of the frequency divider must be adjustable in accordance with the signal wave to be measured, said restraint becomes remarkable, whereby its embodiment would become impossible in a certain case.

Therefore, an essential object of this invention is to provide an improved system as described above which can generate a highly precise movable pulse having a desirable measuring range by use of relatively simple devices.

Said object and other objects of this invention have been attained by the system, in which a series of frequency dividers, the frequency dividing ratios of the dividers being made close to one another, are arranged so as to be simultaneously operated by means of synchronizing pulses applied from a variable frequency divider, and the movable pulses having a desirable interval between them are made to generate by use of the combined output pulses of said series of frequency dividers.

According to the system as described above, since the frequency differences between the phase shifters are very small and said shifters are similar in their characteristics, design, manufacture and adjustment of the appendant circuits, the phase shifters of said system can be made very simple and this system can be advantageously applied to a measuring system having a variable periodicity of a range wider than that of the conventional similar system.

The novel features which we believe to be characteristic of our invention are set forth with particularity in the appended claims. Our invention itself, however, both as to its manner of construction and manner of operation together with further objects and advantages thereof, may best be understood by reference to the following description taken in connection with the accompanying drawings, in which:

Fig. 1 is a block diagram of one embodiment of this invention.

Fig. 2 is a diagram of wave forms for showing a series of voltage wave forms of the main parts of the embodiment in Fig. 1.

Fig. 3 is a block diagram illustrating another embodiment of this invention, including a pulse delaying circuit.

Referring to Fig. 1, the apparatus comprises a frequency divider or oscillator 1 which supplies the input pulses of a frequency divider of the next stage, a variable frequency divider 2 having output terminal 3, a series of frequency dividers 4', 4'', 4''' . . . The differences between the frequency dividing ratios of said dividers are small relative one another, and the operations of said dividers commence simultaneously for each repeating period by the output pulses of the variable frequency divider 2, rotary type phase shifters 5', 5'', 5''' . . . which are connected, respectively, to the output sides of the frequency dividers 4', 4'', 4''' . . ., pulse generating convertors which convert the output waves of the phase shifters 5', 5'', 5''' . . . into pulses, a pulse combining device 7 having an output terminal 8, and which combines said converted pulses so as to lead out the pulse only when all of said pulses to be combined are brought in coincidence with one another. A gear train 9 consisting of several gears which are, respectively, coupled with the shafts of said phase shifters 5', 5'', 5''' . . . as shown by broken lines. The rotating ratios of said gears are made equal to the frequency dividing ratios of said dividers 4', 4'', 4''' . . .

The gear at the output side of said gear train 9 is coupled with a revolution counter 10. The phase shifters 5', 5'', 5''' . . . and the revolution counter 10 are connected to a coupling 11 capable of rotating said phase shifters and counter by means of a manual operation or electrical operation. The coupling is driven by a suitable means not shown.

The operation of the apparatus in Fig. 1 will be described in connection with the case in which such pulses having a periodicity as shown in Fig. 2–A are applied to the variable frequency divider 2 and to the frequency dividers 4', 4", 4'" . . . from the output side of the oscillator 1.

The variable frequency divider 2 divides the input pulses from the oscillator 1 into pulses having desirable frequency dividing ratios, so that the output differential wave form of said divided pulses becomes such a form as shown in Fig. 2–B. In this case, when only three frequency dividers 4', 4" and 4'" having, respectively, the frequency dividing ratios 5, 6 and 7 are used and the shifted phases of the rotary type phase shifters 5', 5" and 5'" are made zero, the output pulses of the pulse generating convertors 6', 6" and 6'" become, respectively, such forms as shown in Figs. 2–$C_1$, $C_2$ and $C_3$.

On the other hand, the frequency dividers 4', 4" and 4'" are controlled by such synchronizing pulses as shown in Fig. 2–B, so that the phase positions of the initial pulses of such waves as shown in Figs. 2–$C_1$, $C_2$ and $C_3$ are brought in coincidence. Therefore, the pulses in Figs. 2–$C_1$, $C_2$ and $C_3$ are combined in the pulse combining device 7. However, since said device is designed so as to lead out only the output pulse formed by precise coincidence of said three pulses, when the shifted phase is zero, such a pulse as shown in Fig. 2–D can be led out of the terminal 8 and the other pulses can not be led out of said terminal.

As will be understood from Fig. 2, only one pulse is led out for each period of time equal to the product of the minimum common multiple of the frequency dividing ratios of the frequency dividers and the periodicity of the input wave. That is to say, a series of pulses having periodicity equal to the product of the minimum common multiple of the frequency dividing ratios and the periodicity of the input wave is obtained.

Now, when phase shifting is carried out by rotating the rotary type phase shifters 5', 5" and 5'" by means of the coupling 11, such pulses as shown by Figs. 2–$C_1$, $C_2$, $C_3$ and D will be moved right and left while maintaining their relative positions, because combination of all the phase shifters is selected so that their rotating ratios may be proportional to the ratios between the output frequencies of the frequency dividers. For instance, when the rotary type phase shifter having a frequency dividing ratio 5 is rotated four times, such pulses as shown in Fig. 2–$C_1$, $C_2$, $C_3$ and D move rightward by a period $t$ and take such a phase relation as that shown by Figs. 2–$E_1$, $E_2$, $E_3$ and F.

Accordingly, when the pulses F obtained by shifting the pulses by the phase period corresponding to said number of revolutions and the rotated angles of the phase shifters is taken as the standard pulse of a movable pulse, and this pulse is viewed on the fluorescent screen of the cathode ray tube, the time difference or phase difference which is necessary for the coincidence of the movable pulse with the signal wave to be measured can be directly read by means of the revolution counter 10. In this case, it is understandable that the error of the movable pulse is established by the phase shifting accuracy of the rotary type phase shifter having a minimum frequency.

When it is assumed that the error of each of said phase shifters is 1° and the input frequency and maximum dividing ratio are taken, respectively, as 100 kc. and 9, the error becomes as follows.

$$10 \ \mu s. \times 9 \times 1/360 = 0.25 \ \mu s.$$

On the other hand, when four frequency dividers having, respectively, frequency dividing ratios 5, 7, 8 and 9, said range including only one pulse, are used, the phase shifting range will become as follows.

$$10 \ \mu s. \times 5 \times 7 \times 8 \times 9 = 25,000 \ \mu s.$$

In the embodiment in Fig. 1, a part of the variable frequency divider 2 may be used in common as any member of the frequency dividers 4', 4", 4'" . . . .

In Fig. 3 is shown another example of this invention, in which a linear type pulse delaying circuit such as phantastron type pulse delaying circuit is used in combination. The apparatus in Fig. 3 comprises an input terminal 31 for the phase shifting frequency dividers, an input terminal 32 for applying synchronizing periodic pulses, frequency dividers 33' and 33" capable of being operated simultaneously by means of the synchronizing pulse and having nearly equal frequency dividing ratios. Phase shifters 34' and 34" are connected, respectively, to the output sides of the dividers 33' and 33" which are coupled to each other. Pulse generating convertors 35' and 35" which can, respectively, convert the output waves of the phase shifters 34' and 34" into pulse waves, are connected to the phase shifters. A pulse combining device 36 capable of leading out only the pulse wave having large amplitude is made to generate when the pulse of the convertor 35" is brought in coincidence with the pulse of the convertor 35'. The apparatus includes a circuit 37, a pulse selector 38 such as bistable multivibrator, and an output terminal 39 for the movable pulse. The circuit 37 is a delaying circuit such as a cathode coupled phantastron pulse delaying circuit in which the mechanical displacement angle of a variable resister is in a precise linear proportion to the time delay of the output pulse relative to the input pulse. The circuit 37 participates in the major necessary adjustment and the device 36 participates in the fine adjustment.

While we have described particular embodiments of our invention, it will, of course, be understood that we do not wish our invention to be limited thereto, since many modifications may be made and we, therefore, contemplate by the appended claims to cover all such modifications as fall within the true spirit and scope of our invention.

We claim:

1. In a direct reading type measuring system for measuring the time difference between two received signal waves, pulse generating means comprising a generator which produces a constant frequency wave, a variable frequency divider responsive to said generator for periodically generating a synchronizing signal, a plurality of auxiliary frequency dividers independently responsive to said generator and independently synchronized by said periodically generated synchronizing signal, each of said auxiliary frequency dividers generating a series of waves of a different frequency, a plurality of rotary type phase shifters respectively responsive to said auxiliary frequency dividers to shift the phases of the waves of said series of waves in accordance with their respective frequencies, a plurality of pulse generators respectively responsive to said rotary type phase shifters for converting the shifted waves to pulses, means for combining the pulses to select in accordance with the amplitude of the combined pulses delayed pulses having a periodicity equal to the product of the period of the constant frequency wave and the minimum common multiple of the frequency dividing ratios of said auxiliary frequency dividers, and a gear device coupling said rotary type phase shifters so that said rotary type phase shifters have rotating ratios equal to the frequency dividing ratios of said auxiliary frequency dividers to relate the time of occurrence of said delayed pulses with the rotary angle of said rotary type phase shifters in accordance with a standard pulse having a constant phase relation relative to the synchronizing signal, said standard pulse wave and said delayed pulses being used as indicators for the measurement of the time differences between two received signal waves.

2. The direct reading type measuring system for measuring the time difference between two received signal waves as claimed in claim 1, in which the means for combining the converted pulses includes a linear type pulse delaying circuit for shifting a predetermined portion of the signals from the variable frequency divider and a selecting means responsive to said linear type pulse delaying circuit for selecting a delayed pulse.

3. The direct reading type measuring system for measuring the time difference between two received signal waves as claimed in claim 1, in which one of the several auxiliary frequency dividers is substituted by a part of the variable frequency divider.

4. The direct reading type measuring system for measuring the time difference between two received signal waves as claimed in claim 1, in which one of said plurality of auxiliary frequency dividers includes a portion of said variable frequency divider, and said means for combining the generated pulses includes a linear type pulse delaying circuit for shifting a predetermined portion of the signals from said variable frequency divider and a device responsive to said linear type pulse delaying circuit which selects the desired delayed pulse wave from the pulse waves of a series by the output wave of said pulse delaying circuit.

5. Apparatus for indicating a time interval of variable duration by the transmission of first and second signals, each of said first signals indicating the start of a time interval, each of said second signals indicating the termination of a time interval comprising, a source of signal oscillations of a predetermined frequency, a frequency dividing means responsive to said source of signal oscillations to generate a series of said first signals, a plurality of frequency dividers independently responsive to said source of signal oscillations and individually responsive to said frequency divider means to generate synchronized trains of signals, the train of signals from each of said frequency dividers having a frequency which is a different submultiple of said predetermined frequency, a plurality of variable phase shifting means respectively responsive to said plurality of frequency dividers, drivable means coupled to said variable phase shifting means selectively driven for causing the relative phase shift introduced by each of said variable phase shifting means to be proportional to the frequency of the associated train of signals, and detecting means responsive to each of said variable phase shifting means for transmitting second signals upon the simultaneous reception of a signal from each of said trains of signals from said variable phase shifting means.

6. Apparatus according to claim 5, including a plurality of pulse forming means respectively connected between each of said variable phase shifting means and said detecting means.

References Cited in the file of this patent

UNITED STATES PATENTS

| | | |
|---|---|---|
| 2,621,238 | Palmer | Dec. 9, 1952 |
| 2,811,716 | Crist | Oct. 29, 1957 |